J. A. ROELOFSEN.
AMMONIA SATURATOR.
APPLICATION FILED APR. 19, 1910.
969,906.
Patented Sept. 13, 1910.
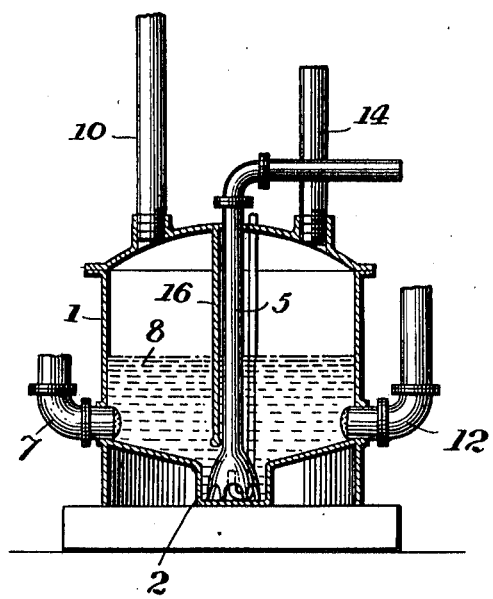
Witnesses
J. G. Hinkel
Charles N. Murray.
Inventor
J. A. Roelofsen.
by Eugene C. Brown
Attorney

UNITED STATES PATENT OFFICE.

JAN ADOLF ROELOFSEN, OF MIDDLESBROUGH, ENGLAND, ASSIGNOR TO THE ACTIEN-GESELLSCHAFT FUER KOHLENDESTILLATION, OF DUSSELDORF, GERMANY, A CORPORATION OF GERMANY.

AMMONIA-SATURATOR.

969,906.  Specification of Letters Patent.  Patented Sept. 13, 1910.

Application filed April 19, 1910.  Serial No. 556,401.

*To all whom it may concern:*

Be it known that I, JAN ADOLF ROELOFSEN, a subject of the King of Great Britain, residing at Southcote, Cambridge Road, Middlesbrough, in the county of York, England, have invented new and useful Improvements in Ammonia - Saturators, of which the following is a specification.

This invention relates to a saturation vessel for the production of solid salts from gases.

One of the objects of my invention is to provide a smaller and more economical apparatus for the recovery of ammonia from gases as a salt, preferably a sulfate, and to recover the residual ammonia remaining in gases of carbonization after they have passed through a cooler, in the same vessel in which the vapors from the ammonia still are absorbed, and yet without contaminating the gases of carbonization with the noxious gases accompanying the vapors from the ammonia still. This vessel is especially applicable to my method of recovering ammonia from coal gases set forth in my copending application, Serial No. 556,402.

My invention will be clearly understood from the following description, in connection with the accompanying drawings showing a vertical section of an apparatus embodying the invention.

The saturator comprises a closed lead or lead-lined vessel 1, having a central depression or pocket 2, in the bottom into which the precipitated salts fall, the bottom of the vessel preferably sloping toward the depression. The precipitated salts which accumulate therein may be removed at intervals by means of an injector or jet pump having a discharge-pipe 5 which extends through the vessel and into the pocket 2. The gases of carbonization which have passed through a cooler and preferably through a tar-extractor, are led into the saturator through a pipe 7, and are freed from residual ammonia as they pass up through the acid solution 8, and pass out through the pipe 10. The hot vapors from the ammonia still are conducted into the vessel 1, through the perforated end of the pipe 12. The contained ammonia is absorbed by the solution, and the noxious gases pass out of the saturator through the pipe 14. I prefer to superheat the vapors coming from the ammonia still before they enter the saturator to prevent condensation of water in the saturator 1, and thereby a lowering of the concentration of the acid solution which would prevent the ammonium salt from separating in the solid state.

In order to prevent any intermingling of the gases of carbonization entering through the pipe 7, with the noxious gases from the ammonia still entering through pipe 12, I provide a diaphragm 16, which dips into the acid solution of ammonium salts 8, and divides the saturator vessel into two compartments. It is evident that this diaphragm does not interfere with the settling of the precipitated salts into the pocket 2, and yet effectually prevents the gases of carbonization entering through pipe 7 from being contaminated by the noxious gases entering through pipe 12. The gases of carbonization led off through pipe 10 are, therefore, uncontaminated by any of the noxious gases liberated by the decomposition of the fixed ammonium salts by the sulfuric acid in the saturator, or other gases coming from the ammonia still, and consequently may be employed for illuminating purposes or for use in gas engines. At the same time, this arrangement of a single vessel containing the acid solution into which both the gas of carbonization and the hot vapors from the ammonia still are led for the purpose of precipitating the solid ammonium salts, results in great economy as well as a simplification of apparatus. The superheated vapors coming from the ammonia still prevent the condensation of water in the saturator and thereby a lowering of the concentration of the acid solution, and the gases of carbonization also entering the same solution can thus be freed from the residual ammonia.

Having now described my invention and one specific form of apparatus embodying the same, I claim as my invention—

1. A saturation vessel for the production of solid salts from gases, having a diaphragm depending from the upper wall into the contained liquid and dividing the vessel into two compartments which are united at the bottom, and an inlet pipe and an outlet pipe in each compartment, said inlet pipes terminating below the surface of the liquid.

2. A saturation vessel for the production of solid salts from gases, provided with a pocket in the bottom and having a diaphragm depending from the upper wall into the contained liquid, dividing the vessel into two compartments which are united at the bottom, and an inlet pipe and an outlet pipe in each compartment, said inlet pipes terminating below the surface of the liquid.

In testimony whereof I have hereunto set my hand in presence of two subscribing witnesses.

JAN ADOLF ROELOFSEN.

Witnesses:
 OSCAR P. KUBACH,
 O. E. STONE.